(12) United States Patent
Li et al.

(10) Patent No.: US 6,431,679 B1
(45) Date of Patent: Aug. 13, 2002

(54) CALIBRATION OF PRINT CONTRAST USING AN OPTICAL-ELECTRONIC SENSOR

(75) Inventors: Guo Li; David Charles Towery; Francis Bockman, all of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/543,162

(22) Filed: Apr. 4, 2000

(51) Int. Cl.$^7$ .................................................. B41J 2/01
(52) U.S. Cl. ........................................................ 347/19
(58) Field of Search .............................. 547/15, 19, 37; 358/504, 406; 250/214 R, 573, 577

(56) References Cited

U.S. PATENT DOCUMENTS 6,198,549 B1 * 3/2001 Decker ....................... 358/504
6,247,780 B1 * 6/2001 Matsubara et al. ........... 347/19

* cited by examiner

*Primary Examiner*—Craig A. Hallacher (57) ABSTRACT

The present invention is embodied in a system and method for automatically calibrating the print contrast of an inkjet printing system using an optical-electronic sensor to detect an ink drop volume. The print contrast calibration system includes an optical-electronic sensor that obtains test pattern data from a printed test pattern, a calibration module that contains calibration data for the printing system, an installation module that determines a drop volume score by using the test pattern data and the calibration data and a printing module that determines a print contrast setting based on the drop volume score. The present invention also includes a method for calibrating print contrast in a printing system by storing standard calibration curves for the printing system, comparing the standard calibration curves with a printhead assembly calibration curve to determine a drop volume score, and setting the print contrast based on the drop volume score.

21 Claims, 11 Drawing Sheets

CALIBRATION OF PRINT CONTRAST USING AN OPTICAL-ELECTRONIC SENSOR

FIELD OF THE INVENTION

The present invention relates in general to inkjet printing systems and more specifically to system and method for automatically calibrating the print contrast of an inkjet printing system by using an optical-electronic sensor to detect an ink drop volume.

BACKGROUND OF THE INVENTION

Inkjet printing systems are popular and common in the computer field. These printing systems are described by W. J. Lloyd and H. T. Taub in "Ink Jet Devices," Chapter 13 of Output Hardcopy Devices (Ed. R. C. Durbeck and S. Sherr, San Diego: Academic Press, 1988) and U.S. Pat. Nos. 4,490,728 and 4,313,684. Inkjet printings systems produce high-quality print, are compact and portable, and print quickly and quietly because only ink strikes a print medium (such as paper).

An inkjet printing system produces a printed image by printing a pattern of individual dots (or pixels) at specific defined locations of an array. These dot locations, which are conveniently visualized as being small dots in a rectilinear array, are defined by the pattern being printed. The printing operation, therefore, can be pictured as the filling of a pattern of dot locations with dots of ink.

Inkjet printing systems print dots by ejecting a small volume of ink onto the print medium. These small ink drops are positioned on the print medium by a moving carriage assembly that supports a printhead assembly (or printhead cartridge) containing ink-drop generators. The carriage assembly traverses over the print medium surface and positions the printhead assembly depending on the pattern being printed. An ink supply, such as an ink reservoir, supplies ink to the drop generators. The drop generators are controlled by a microprocessor or other controller and eject ink drops at appropriate times upon command by the microprocessor. The timing of ink drop ejections typically corresponds to the pixel pattern of the image being printed.

In general, the drop generators eject ink drops through a nozzle or an orifice by rapidly heating a small volume of ink located within a vaporization or firing chamber. The vaporization of the ink drops typically is accomplished using an electric heater, such as a small thin-film (or firing) resistor. Ejection of an ink drop is achieved by passing an electric current through a selected firing resistor to superheat a thin layer of ink located within a selected firing chamber. This superheating causes an explosive vaporization of the thin layer of ink and an ink drop ejection through an associated nozzle of the printhead.

Color inkjet printing systems usually have either a separate printhead for each color of ink or have a single printhead assembly fluidically coupled to ink reservoirs each containing a different ink color. Ideally the volume of each ink drop ejected from the nozzle of either printhead configuration is uniform and has minimal variation between drops. In reality, however, the ink drop volumes of inkjet printing systems can vary significantly due in part to manufacturing variances. For printing systems having a separate printhead for each ink color, ink drop volume variance can cause a shift in both hue and print contrast. For printing systems having a single printhead coupled to multiple ink colors, ink drop volume variance can cause a shift in print contrast. Print contrast shift is undesirable because the image printed by the printing system will not accurately reproduce the true colors of the original image. In other words, a shift in print contrast reduces the accuracy and reliability of the printing system. Thus, there exists a need for a printing system capable of alleviating any variance in ink drop volume and the resulting shift in print contrast.

SUMMARY OF THE INVENTION

To overcome the limitations in the prior art as described above, and to overcome other limitations that will become apparent upon reading and understanding the present specification, the present invention is embodied in a print contrast calibration system for an inkjet printing system that provides a automatic calibration of print contrast. This automatic calibration system determines ink drop volume using an optical-electronic sensor and adjusts the print contrast to compensate for any variance in ink drop volume. As use in this application, print contrast calibration includes all types of contrast calibration including hue calibration.

The print contrast calibration system of the present invention includes: (1) an optical-electronic sensor that obtains test pattern data from a test pattern printed on a print media; (2) a standard test module that creates standard test curves for a particular printing system, preferably during the product development stage; (3) a standard calibration curve generation module that creates standard calibration curves, preferably during the product development stage; (4) an installation module that uses standard test data and test pattern data to determine a drop volume score for a printhead assembly installed in the printing system; and (5) a printing module that creates a calibration curve for a particular printhead assembly based on its drop volume score and the standard calibration curves. The installation module is run automatically each time a new printhead assembly is installed in the printing system or whenever the user desires to start the calibration process. Once the drop volume score is obtained the printing module uses the score each time the printing system prints. The data for the standard test module and the standard calibration curve generation module preferably are generated during the product development stage, stored in a memory device and accessible by the remainder of the print calibration system. The print contrast calibration system of the present invention is able to automatically adjust the print contrast in a printing system without any user intervention to alleviate any variance in print contrast between printed images.

The present invention is also embodied in a method for calibrating print contrast in a printing system. The method includes storing a set of standard test curves, comparing the standard test curves with a printhead assembly test curve to determine a drop volume score and setting the print contrast by creating a calibration curve based on the drop volume score and the standard calibration curves.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the present invention.

Referring now to the drawings in which like reference numbers represent corresponding parts throughout.

DETAILED DESCRIPTION OF THE PREFERRED EMBODIMENTS

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The present invention is embodied in a print contrast calibration system for an inkjet printing system that uses an optical-electronic sensor to determine an ink drop volume of a printhead assembly. The printhead assembly is installed in the printing system and prints a test pattern on a print media (such as paper). The optical-electronic sensor scans the test pattern and obtains test pattern data that is used to create a printhead assembly test curve. This printhead assembly test curve is compared with a set of standard test curves that are created for a specific model of printing system. These standard test curves are created by inserting into the printing system different printhead assemblies having a range of ink drop volumes, including, for example, a known low ink drop volume and a known high ink drop volume. The printhead assembly test curve and the set of standard test curves (that are stored in a memory device) are then used to determine a setting for the print contrast. It should be noted that, as used in this application, curves also include tables or other types of data.

The present invention greatly reduces any print contrast shift due to a variance in ink drop volume by determining the ink drop volume of a printhead assembly and adjusting the print contrast accordingly. Any shift in print contrast from one printed image to another is greatly reduced, even if a different printhead assembly is used in the printing system.

II. Structural Overview

Figure 1:
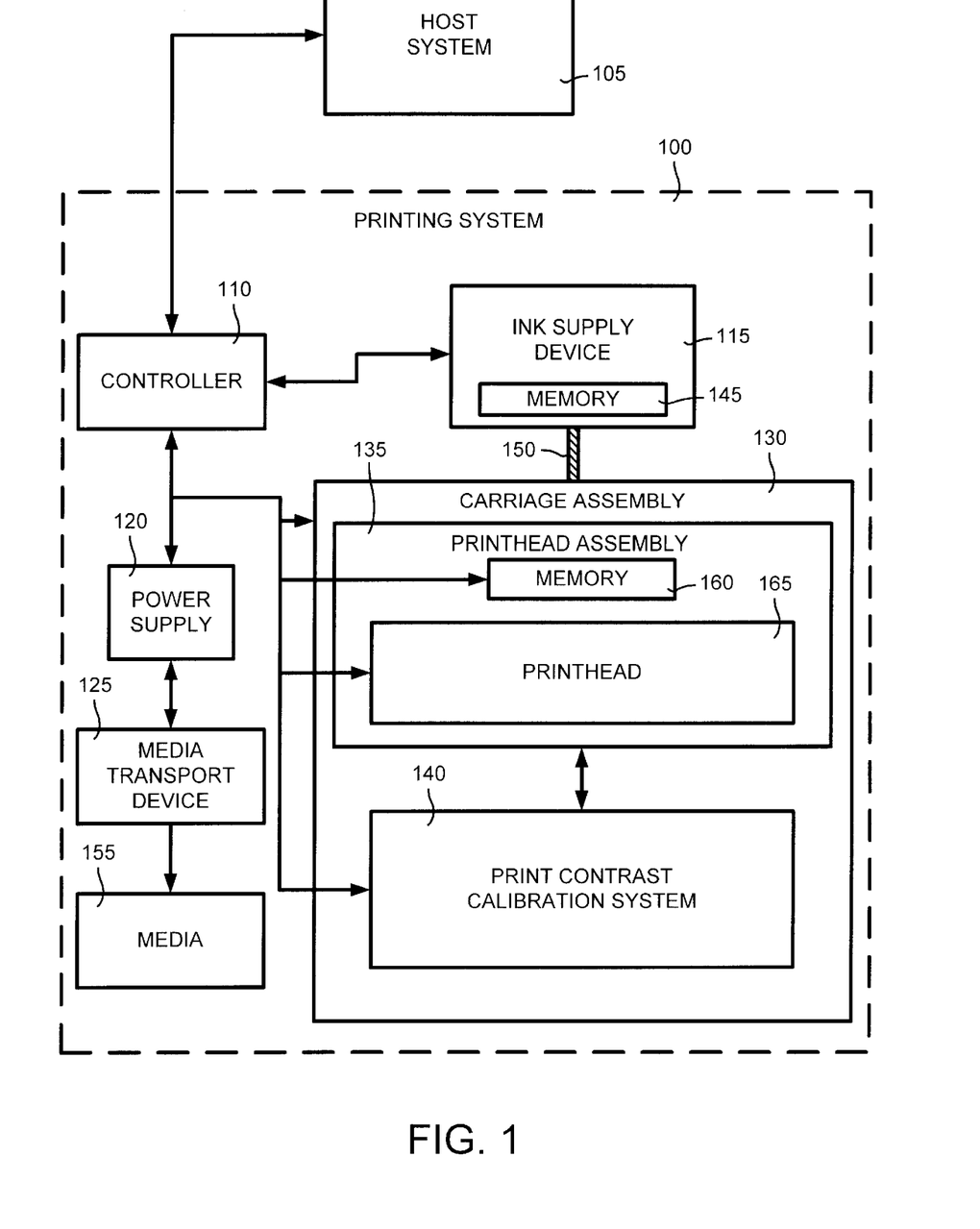
FIG. 1 is a block diagram of an overall printing system incorporating the present invention.

FIG. 1 is a block diagram of an overall printing system incorporating the present invention. The printing system 100 can be used for printing a material, such as ink on a print media, which can be paper. The printing system 100 is electrically coupled to a host system 105, which can be a computer or microprocessor for producing print data. The printing system 100 includes a controller 110 coupled to an ink supply device 115, a power supply 120, a media transport device 125, a carriage assembly 130 a printhead assembly 135 and a print contrast calibration system 140. The ink supply device 115 includes an ink supply memory device 145 and is fluidically coupled via a fluid conduit 150 to the printhead assembly 135 for selectively providing ink to the printhead assembly 135. The media transport device 125 provides a means to move a print media 155 relative to the printing system 100. Similarly, the carriage assembly 130 supports the printhead assembly 135 and provides a means to move the printhead assembly 135 to a specific location over the print media 155 as instructed by the controller 110.

The printhead assembly 135 includes a memory device 160 and a printhead 165 that ejects drops of ink onto the print media 155 as instructed by the controller 110. Printing of an image is performed by the host system 105 transmitting print data to the printing system 100. The controller 110 within the printing system 100 instructs the printhead assembly 135 to eject ink drops such that the print data is printed as on printed image on the print media 155. The print contrast calibration system 140 of the present invention is located on the carriage assembly 130 and, as discussed further below, calibrates the print contrast of a printed image by detecting an ink volume.

During operation of the printing system 100, the power supply 120 provides a controlled voltage to the controller 110, the media transport device 125, the carriage assembly 130, the printhead assembly 135 and the print contrast calibration system 140. In addition, the controller 110 receives the print data from the host system 105 and processes the data into printer control information and image data. The processed data, image data and other static and dynamically generated data is exchanged with the ink supply device 115, the media transport device 125, the carriage assembly 130, the printhead assembly 135 and the print contrast calibration system 140 for efficiently controlling the printing system 100.

Exemplary Printing System

Figure 2:
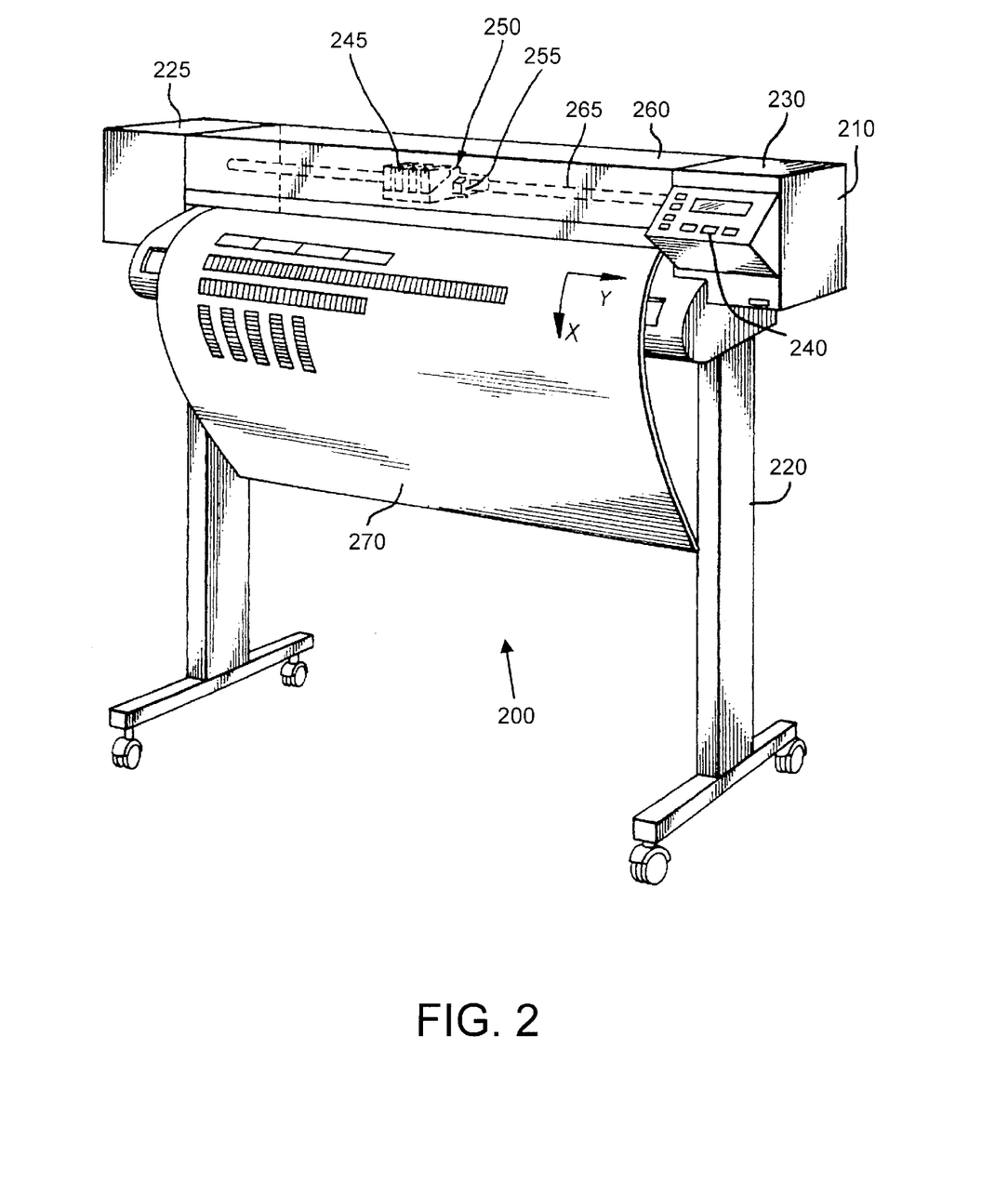
FIG. 2 is a perspective view of an exemplary high-speed large format printing system that incorporates the invention and is shown for illustrative purposes only.

FIG. 2 is a perspective view of an exemplary high-speed large format printing system 200 that incorporates the invention and is shown for illustrative purposes only. The printing system 200 includes a housing 210 mounted on a stand 220. The housing 210 has a left media transport mechanism cover 225 and a right media transport mechanism cover 230 housing a left media transport mechanism (not shown) and a right media transport mechanism (not shown), respectively. A control panel 240 is mounted on the right media transport mechanism cover 230 and provides a user interface with the printing system 200.

A carriage printhead assembly 245 includes a printhead assembly 250 and a print contrast calibration system 255. Both the printhead assembly 250 and the print contrast calibration system 255 are mounted on the carriage assembly 245 and are both shown under a transparent cover 260. The carriage assembly 245 positions the printhead assembly 250 and the print contrast calibration system 255 along a carriage bar 265 in a horizontal direction denoted by the "y" axis. A print media 270 (such as paper) is positioned by the media transport mechanism (not shown) in a vertical direction denoted by the "x" axis.

Figure 3:
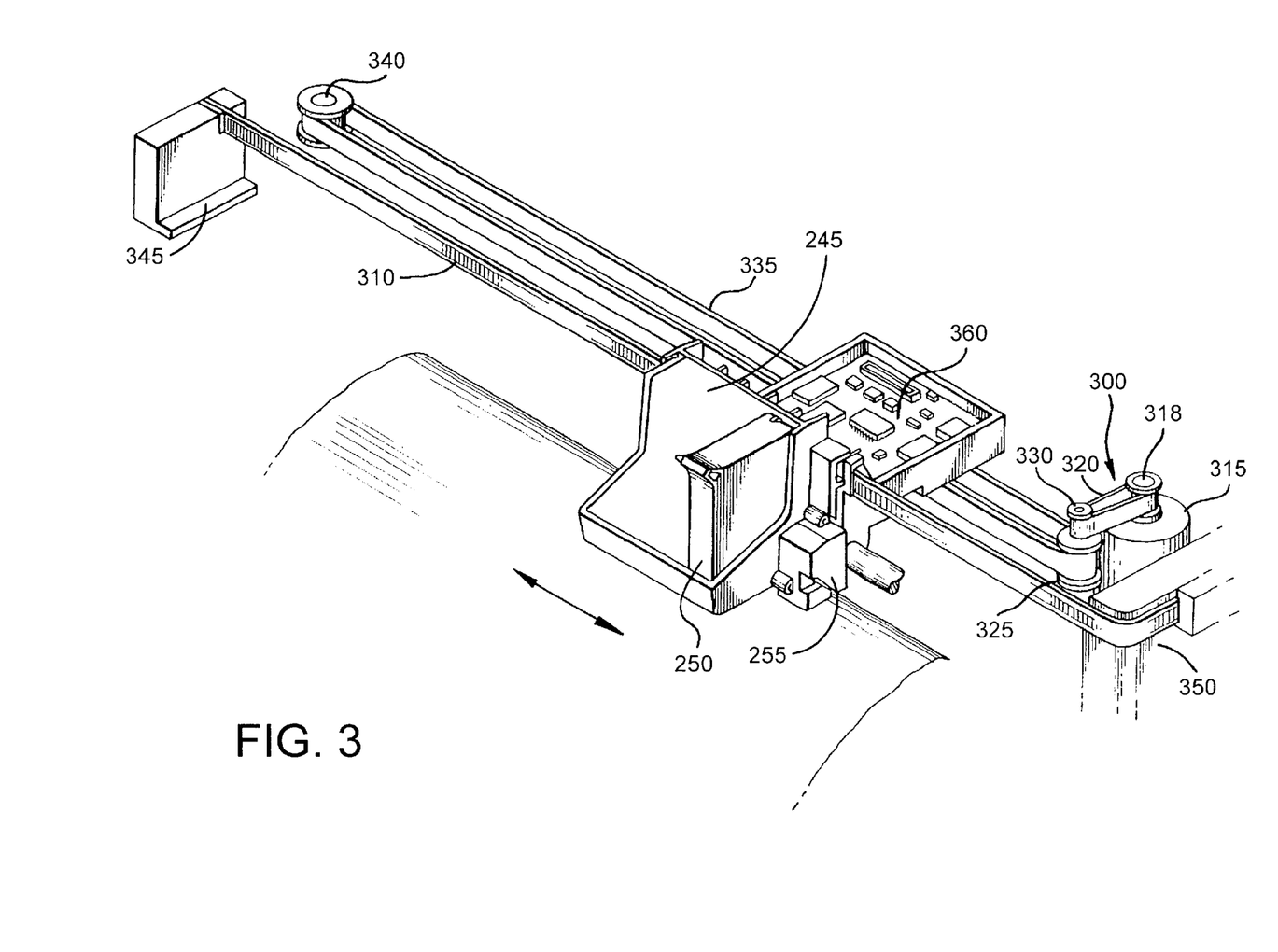
FIG. 3 is a perspective view of the carriage assembly and the carriage assembly positioning device contained in the exemplary printing system of FIG. 2.

FIG. 3 is a perspective view of the carriage assembly 245, a carriage assembly positioning device 300 and an encoder strip 310 contained in the exemplary printing system 200 of FIG. 2. The carriage assembly 245 includes the printhead assembly and the print contrast calibration system 255. In the exemplary example of FIG. 3, the carriage assembly includes only one printhead assembly 250. However, the carriage assembly 245 includes slots for additional printhead assemblies to be inserted into the carriage assembly 245.

The carriage assembly positioning device 300 includes a carriage assembly positioning motor 315 that has a shaft 318 extending out of the motor 315. Through a belt 320 the motor 315 drives an idler 325 via the shaft 330. In turn, the idler 325 drives a belt 335 that is secured by a second idler 340. The belt 335 is attached to the carriage assembly 245 and adapted to slide through the carriage assembly 245. The position of the carriage assembly 245 in the scan axis (the "y" axis) is determined precisely by the use of the encoder strip 310. The encoder strip 310 is attached by a first support 345 on one end and a second support 350 on the other end. The print media 270 and carriage assembly 245 position information is provided to a processor 360 located on the carriage assembly 245.

Figure 4:
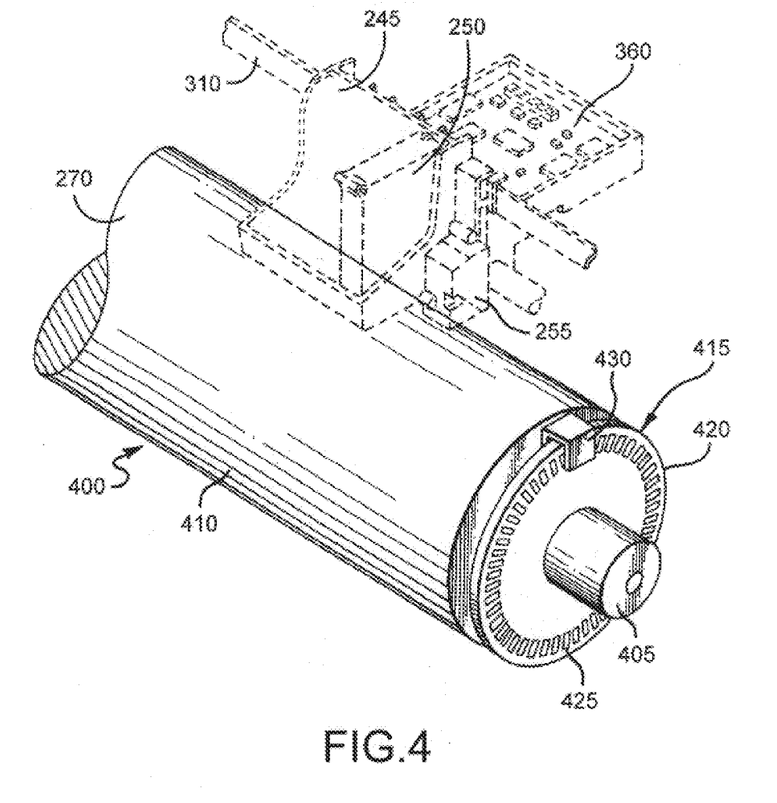
FIG. 4 is a perspective view of the media positioning device contained in the exemplary printing system of FIG. 3.

FIG. 4 is a perspective view of the media transport device 400 contained in the exemplary printing system of FIG. 3. The media transport device 400 includes a motor 405 that is coaxial with a media roller 410. The position of the media roller 410 is determined by a media position encoder 415. The media position encoder 415 includes a disc 420 having a plurality of apertures 425. An optical reader 430 provides a plurality of output pulses that determine the position of the media roller 410 as well as the position of the media 270.

Figure 5:
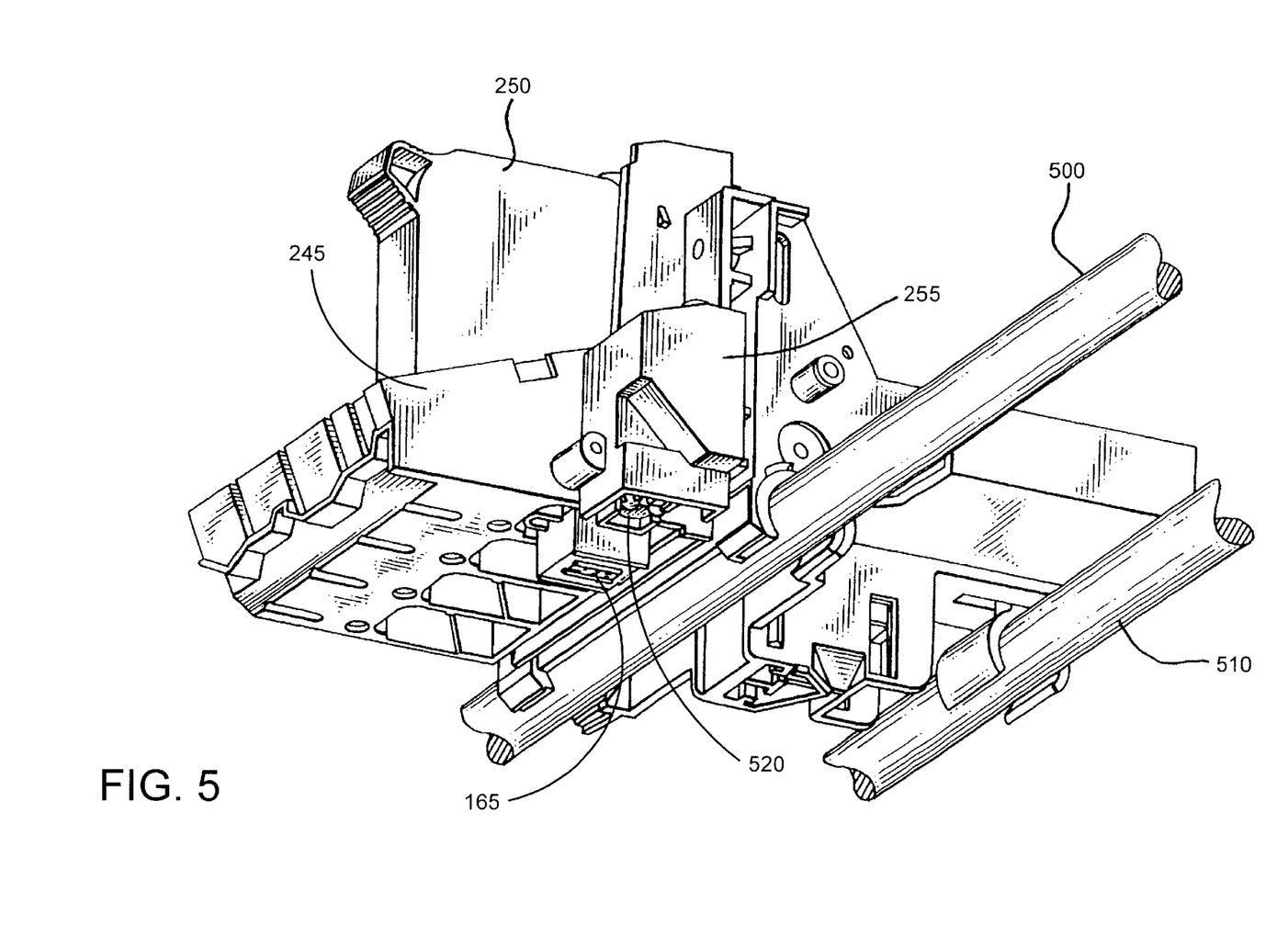
FIG. 5 is a perspective view from under the carriage assembly of FIG. 2 showing the optical-electronic sensor assembly.

FIG. 5 is a perspective view from under the carriage assembly of FIG. 2 showing the optical-electronic sensor assembly. The carriage assembly 245 rides on a front slider 500 and a rear slider 510 to permit motion a direction parallel to the sliders. The carriage assembly 245 includes a printhead assembly (only one is shown) including the printhead 165 that faces toward the print media (not shown). The carriage assembly also includes the print contrast calibration system 255 (described in detail below) that has an optical-electronic sensor 520 aligned with the printhead 165 such that the sensor 520 also faces the print media (not shown).

Print Contrast Calibration System

Figure 6:
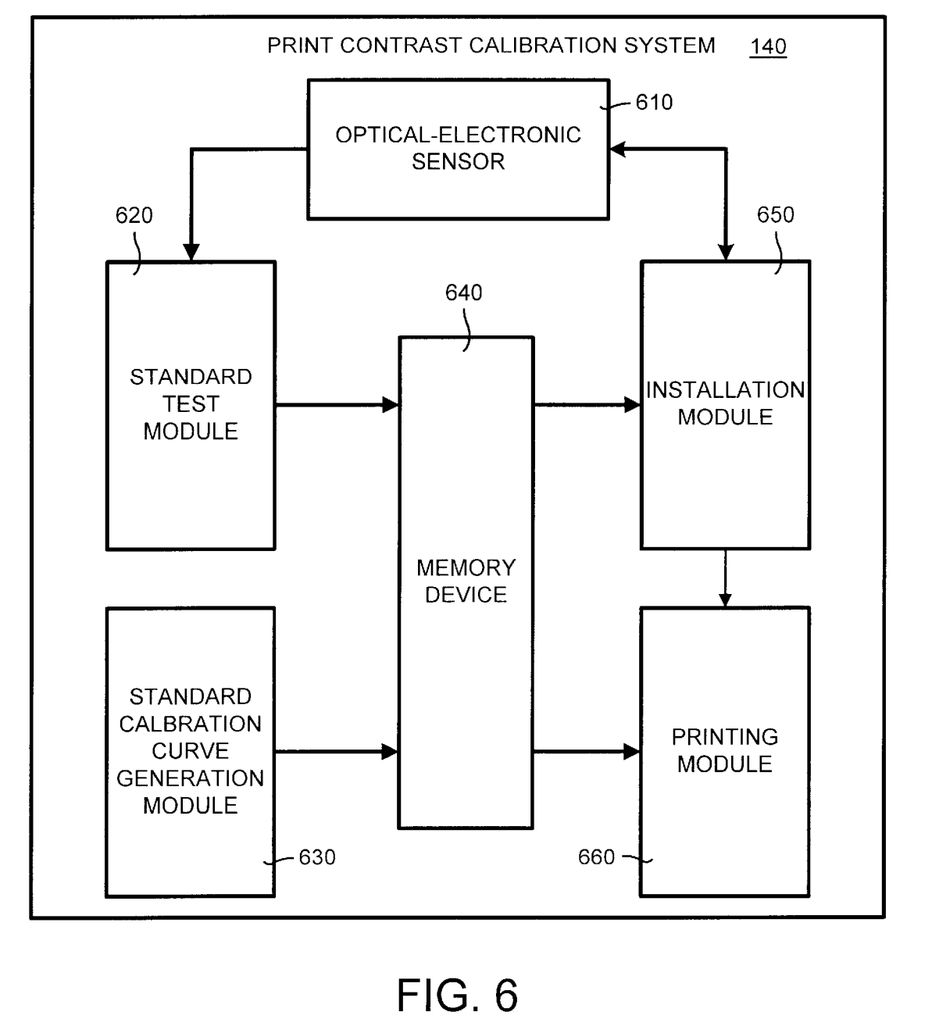
FIG. 6 overall block diagram of the print contrast calibration system (including the optical-electronic sensor assembly) of the present invention shown in FIG. 1.

FIG. 6 overall block diagram of the print contrast calibration system (including the optical-electronic sensor assembly) of the present invention shown in FIG. 1. In general, the print contrast calibration system 140 includes an optical-electronic sensor 610 that optically senses a test pattern printed on the print media and converts these optical readings into digital signals using an analog-to-digital converter. These digital signals are used to provide information about an ink drop volume of a printhead assembly.

The print contrast calibration system 140 further includes a standard test module 620 and a standard calibration curve generation module 630, which creates standard test data and standard calibration data obtained for the printing system during manufacture of the printing system. This data is stored in a memory device 640, which preferably is a read-only memory device (ROM) device. Moreover, an installation module 650 uses the data from the standard test module 620 (that is stored in the memory device 640) and the digital signals from the optical-electronic sensor 610 to calculate a drop volume score for a particular printhead assembly. A new drop volume score is calculated each time a new printhead assembly is inserted into the inkjet printing system or whenever a user manually starts the process from a user interface. A printing module 660 uses the drop volume score from the installation module 650 and the standard calibration data from the standard calibration curve generation module 630 (that is stored in the memory device 640) to calibrate the print contrast of a printed image. The printing module 660 is used each time the printing system prints.

Figure 7:
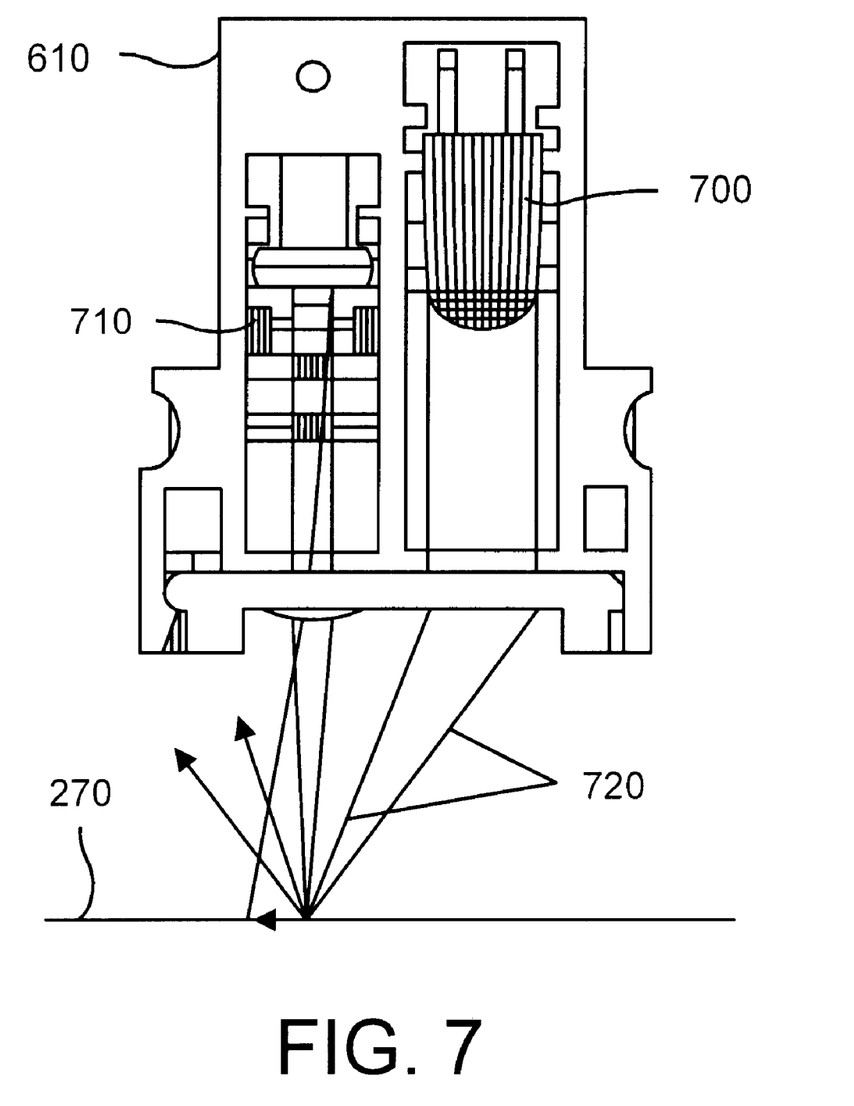
FIG. 7 is a cut-away view of the optical-electronic sensor of the present invention.

FIG. 7 is a cut-away view of the optical-electronic sensor 610 of the present invention. The optical-electronic sensor 610 includes a light source 700 (such as a light-emitting diode (LED)). In a preferred embodiment, two LEDs are used in the optical-electronic sensor 610. An optical detector 710 is positioned within the sensor 610 such that any light 720 emitted from the light source 700 first impinges on a test pattern printed on the print media 270 and is detected by the optical detector 710. The optical detector 710 transmits optical readings to an analog-to-digital converter (not shown) for conversion into digital signals. These digital signals are then transmitted upon request to the standard test module 620 or installation module 650 for use by these modules.

III. Operational Overview

In general, the print contrast calibration system of the present invention evaluates a drop volume for a current printhead assembly by comparing a test curve for the current printhead assembly with a set of standard test curves. Once the drop volume is known a calibration curve is created by interpolating between a set of standard calibration curves. This calibration curve calibrates the print contrast with the ink drop volume to maintain an essentially constant print contrast between printed images, even images printed on the same printing system but using a different printhead assembly. The operation of each of the modules included in the print contrast calibration system will now be discussed.

Standard Test Module

The standard test module 620 generally is only run at the product development stage. The standard test module 620 creates standard test data that is stored in the memory device 640 and used by the installation module 650. The standard test data is obtained by using a measurement process (described in detail below) that measures ink drop volumes for a variety of standard printhead assemblies. A printhead assembly having a known low ink drop volume, a printhead assembly having a known high ink drop volume and, in a preferred embodiment, a printhead assembly having a normal ink drop volume are selected as standard printhead assemblies. These standard printhead assemblies are used to create a set of standard test curves. Thus, for a specific model of inkjet printing system the standard test data need only be determined once (for example, during the product development stage of the printing system).

Figure 8:
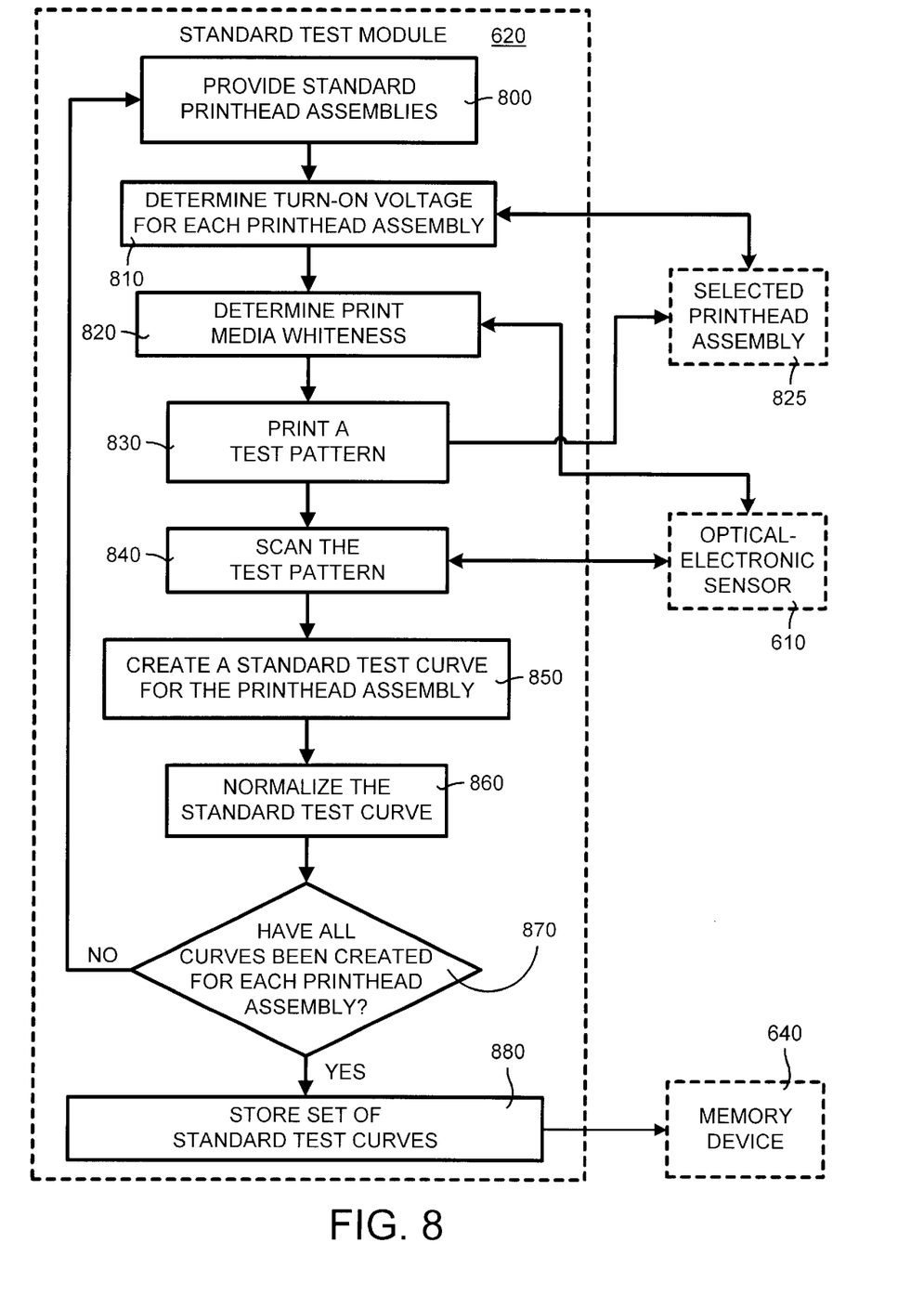
FIG. 8 is an overall flow diagram of the standard test module of the print contrast calibration system.

FIG. 8 is an overall flow diagram of the standard test module 620 of the print contrast calibration system 140. The standard test data is obtained by providing one of the standard print assemblies at a given time (box 800). Preferably, the ink drop volume of these standard printhead assemblies are at the high end and the low end of the ink drop volumes that may be encountered by the printing system in actual operation. In addition, at least two printhead assemblies are needed to be able to interpolate between the curves created for each printhead assembly. Preferably, three standard printhead assemblies are used, one having a high drop volume, one having normal drop volume and one having a low drop volume. Alternatively, greater than three printhead assemblies may be used to obtain the standard test data. Providing more than three printhead assemblies increases the accuracy of the calibration result but also increases the memory needed to store the data as well as the time and processing power needed to calculate the data.

Next, a turn-on voltage for each printhead assembly is determined (box 810). The turn-on voltage is the voltage required to cause all nozzles on the printhead assembly to eject an ink drop. An operating voltage ($V_{OP}$) is determined from the turn-on voltage such that $V_{OP}$ is provides sufficient voltage to eject on ink drop. The $V_{OP}$ is then written to the memory device 640 of the printhead assembly. This procedure is well-known to those skilled in the art.

In the next part of the process the optical-electronic sensor 610 is used to scan through a white print media to determine print media whiteness (box 820). In a preferred embodiment, the print media is a white sheet of paper. The optical-electronic sensor 610 obtains optical data (such as intensity) and averages this optical data over the entire print media. The averaged data is used as a white point that will be used later in a normalization process. Preferably, the voltage to the light source of the optical-electronic sensor 610 is adjusted so that the data obtained from scanning the white print media is within a certain predetermined range. This sensor voltage adjustment compensates for variance among sensor light sources and assures that the sensor 610 operates in a linear range.

Figure 9:
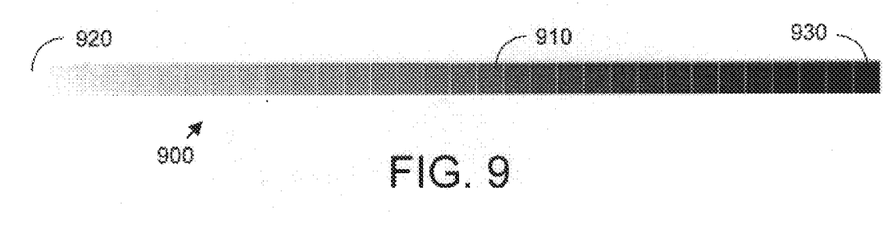
FIG. 9 is an example of a test pattern used in the present invention.

The next portion of the process creates the actual test curves for each standard printhead assembly. A standard printhead assembly is selected (box 825) and a test pattern is printed on the white print media (box 830). The test pattern may include all or part of each color of ink contained in the printhead assembly. Preferably, the test pattern is a halftone test pattern having a plurality of patches. In a preferred embodiment, the test pattern is either a neutral ramp having a RGB value from (0,0,0) to (255,255,255) or a blue test pattern having a RGB value from (0,0,255) to (255,255,255). The optical-electronic sensor 610 then scans through the test pattern and a serial optical reading (such as intensity) is obtained (box 840). An example of a test pattern is shown in FIG. 9. In particular, the test pattern 900 contains individual tiles 910 that range from a lightest tile 920 to a darkest tile 930.

Next, a test curve is created for the standard printhead assembly (box 850). The standard test curve is then normalized (box 860) based on the paper white point and the lowest signal in the standard test curve. The process then checks to see if a standard test curve has been created for each one of the printhead assemblies (box 870). If not, then the process provides another printhead assembly (box 800) that has not had a standard test curve created. Otherwise, a set of standard test curves (a test curve for each standard printhead assembly) is stored in the memory device 640 (box 880).

Standard Calibration Curve Generation Module

This module needs to be run only once, preferably during the product development stage. The standard calibration curve generation module creates standard calibration data that is stored (such as on the memory device 640) and accessible to the printing module 660. In general, the standard calibration data is created by using a measurement and inverse process (described in detail below) to correspond to the ink drop volume of a variety of standard printhead assemblies. In a preferred embodiment, these are the same set of standard printhead assemblies used in the standard test module 620.

Figure 10:
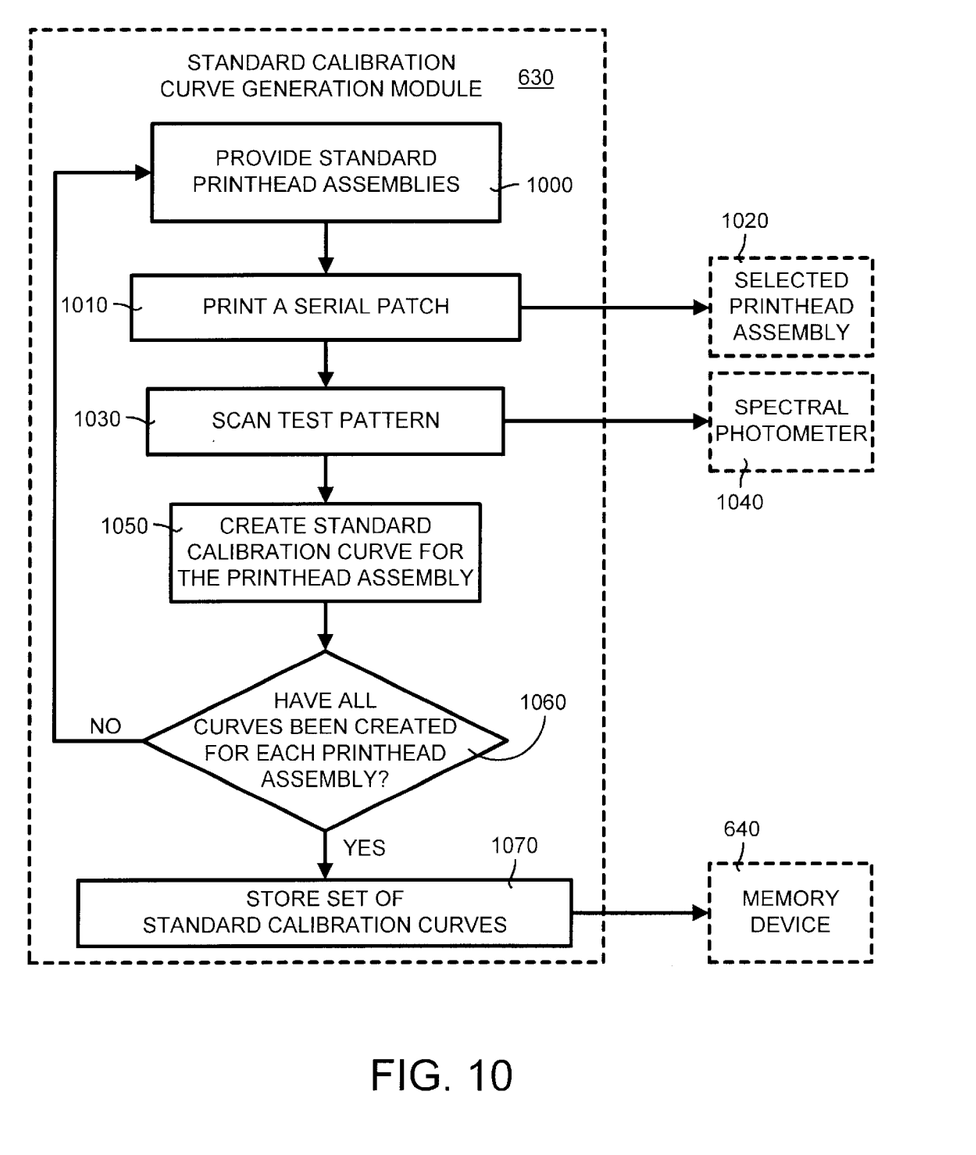
FIG. 10 is an overall flow diagram of the standard calibration curve generation module of the print contrast calibration system.

FIG. 10 is an overall flow diagram of the standard calibration curve generation module 630 of the print contrast calibration system 140. First, a set of standard printhead assemblies is provided (box 1000). Then the process prints a serial evenly spaced gray patches (box 1010) for a selected printhead assembly 1020 using the default imaging printing procedure. Preferably, there are 256 patches printed have RGB index values ranging from 255, 254 to 0 and the same value for RGB. The same turn-on voltages are used for each printhead assembly as in the standard test module 620.

The printed serial patches are then scanned (box 1030) and measured with a spectrophotometer 1040 and a corresponding measurement value is determined for each index value. For each printhead assembly the measured result is correlated to the measured result of a printhead assembly having a normal drop volume. In this way, standard calibration curves are created for the printhead assembly (box 1050). The process then determines whether all the curves have been created for each printhead assembly (box 1060). If not, then the process returns to the beginning to obtain another printhead assembly (box 1000). Otherwise, the set of standard curves are stored (box 1070) in the memory device 640.

In a preferred embodiment, the standard calibration curve is a one-dimensional look-up table that is created for each printhead assembly. When the input of the look-up table is equal to a certain index value of the printhead assembly, the output equals an index value of the printhead assembly with the normal drop volume. In other words, the corresponding measured values for the two index values are the same. This procedure is well known to those skilled in the art. A special case occurs when one-dimensional look-up table for the printhead assembly having a normal drop volume is a straight line from 0,0 to 255,255. After the look-up tables are created they are stored in the memory of all printing systems of this type during the manufacturing process.

Installation Module

The installation module 650 is used to evaluate a drop volume each time a user installs a new printhead assembly into the inkjet printing system or whenever a user chooses to start the calibration process. During this calibration process, a drop volume score is generated and save into memory (such as a flash memory) of the inkjet printing system. The drop volume score, which will not change its value even after the power of the printing system is switched off, is used by the printing module 660 whenever the inkjet printing system prints.

Similar to the process of the standard test module 620, the process of the installation module 650 begins by turn-on voltage determination, paper white detecting, test pattern printing, test pattern scanning, test curve generating and test curve normalization. The test curve of the installation module 650 is then compared with the set of standard test curves stored in the memory device 640 and a drop volume (DV) score is calculated for the newly-installed printhead assembly. As discussed below, this DV score may be modified based on print media factors (such as the type of print media).

Figure 11:
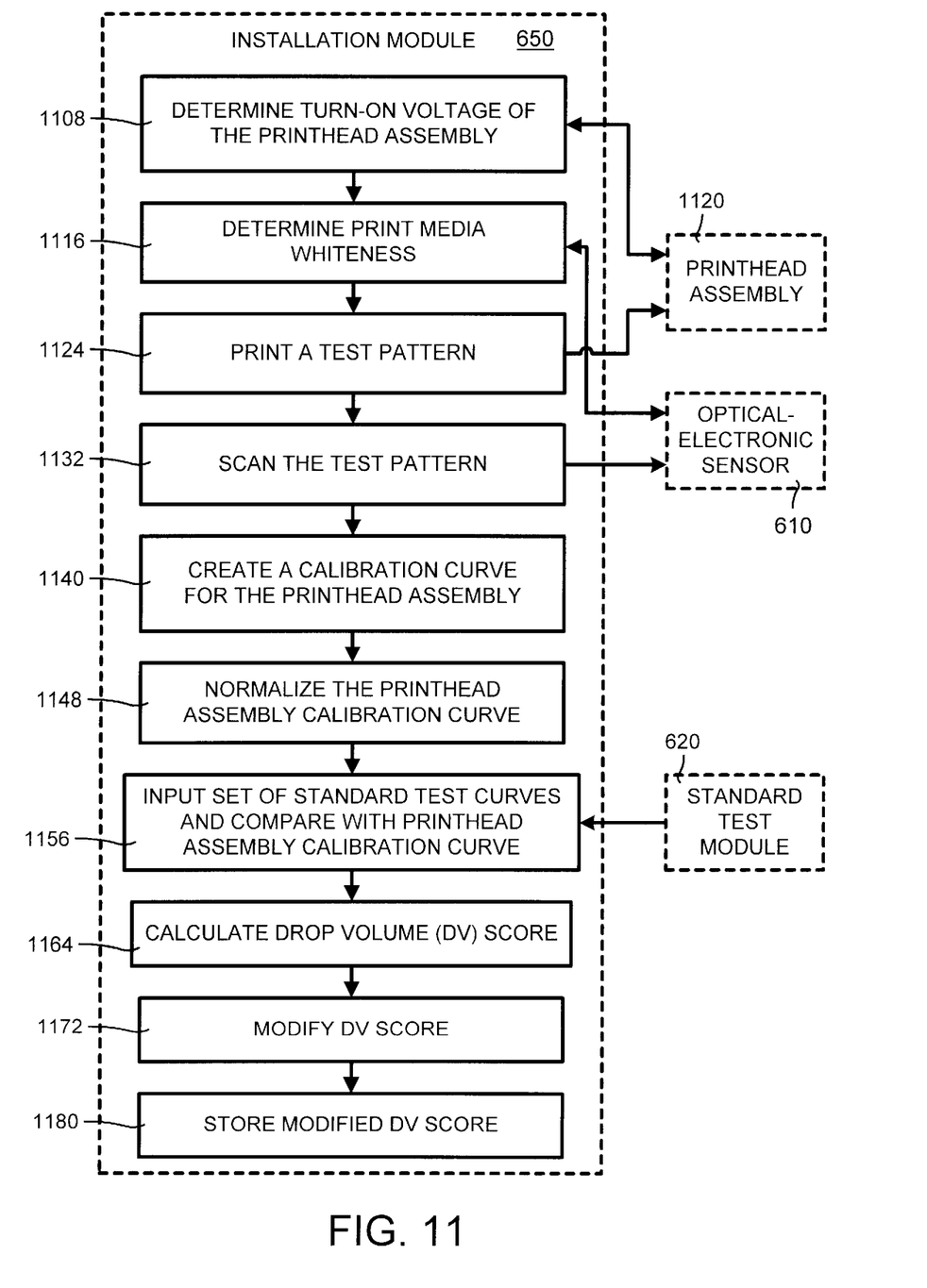
FIG. 11 is an overall flow diagram of the installation module of the print contrast calibration system.

FIG. 11 is an overall flow diagram of the installation module of the print contrast calibration system. A turn-on voltage of a printhead assembly is determined (box 1108) as well as an operating voltage ($V_{OP}$), which is then written to a memory device of the printhead assembly 1120. Next, the optical-electronic sensor 610 is used to scan through a white print media (box 1116) to determine the whiteness of the media. As before, in a preferred embodiment the print media is a white sheet of paper. The optical-electronic sensor 610 obtains optical data (such as intensity) and averages this optical data over the entire print media and the averaged data is used as a white point. As in the standard test module 620, preferably the voltage to the sensor 610 is adjusted so that the data obtained from scanning the white print media is within a certain predetermined range. This sensor voltage adjustment compensates for variance among sensor light sources and assures that the sensor operates in a linear range.

A test pattern is then printed by the newly-installed printhead assembly 1120 onto the print media (box 1124). The test pattern printed is the same test pattern used in the standard test module 620. The test pattern is then scanned by the optical-electronic sensor 610 to obtain optical readings (box 1132). A test curve for the printhead assembly 1120 is then created based on the optical readings (box 1140). The printhead assembly test curve is normalized based on the white point of the media and the lowest (darkest) signal in the optical readings (box 1148).

Next, the set of standard test curves is received by the installation module 650 from the memory device 640 and the newly-created test curve of the printhead assembly 1120 is compared with the set of standard test curves (box 1156). The difference between the test curve of the printhead assembly 1120 and the weighted set of the standard test curves is given by the following equation:

$$D_{test}=(A_{i1}+A_{i2}+A_{i3})*X_{test}-(A_{i1}*X_{low}+A_{i2}*X_{norm}+A_{i3}*X_{high})$$

where $X_{test}$ is the printhead assembly test curve and $X_{low}$, $X_{norm}$ and $X_{high}$ are the set of standard test curves. This equation assumes that there are three standard test curves (i.e. printhead assemblies having a low drop volume, a normal drop volume and a high drop volume). If there are two printhead assemblies then $X_{norm}$ is equal to zero and if there are more than three curves they are added in the equation. The parameters $A_{i1}$, $A_{i2}$ and $A_{i3}$ are weighted parameters for each of the set of standard test curves. $D_{test}$ is calculated for each different set of $A_{i1}$, $A_{i2}$ and $A_{i3}$. In other words, a set of $A_{i1}$, $A_{i2}$ and $A_{i3}$ is calculate for each i. In a preferred embodiment, each set of $A_{i1}$, $A_{i2}$ and $A_{i3}$ is chosen so either $A_{i1}$ or $A_{i3}$ is equal to zero and the sum of $A_{i1}$, $A_{i2}$ and $A_{i3}$ remains constant. In a working example, a sample set was given as:

| i | $A_{i1}$ | $A_{i2}$ | $A_{i3}$ |
|---|---|---|---|
| 0 | 6 | −1 | 0 |
| 1 | 5 | 0 | 0 |
| 2 | 4 | 1 | 0 |
| 3 | 3 | 2 | 0 |
| 4 | 2 | 3 | 0 |
| 5 | 1 | 4 | 0 |
| 6 | 0 | 5 | 0 |
| 7 | 0 | 4 | 1 |
| 8 | 0 | 3 | 2 |
| 9 | 0 | 2 | 3 |
| 10 | 0 | 1 | 4 |
| 11 | 0 | 0 | 5 |
| 12 | 0 | −1 | 6 |

A drop volume (DV) score is then calculated using $D_{test}$ and the parameters (box 1164). Specifically, only one i will minimize $D_{test}$. The minimum $D_{test}$ value at a certain i is used as the DV score. In the working example given above, the sample set of $A_{i1}$, $A_{i2}$ and $A_{i3}$ have DV scores ranging from 0 to 12. A score of 6 means that a current printhead assembly has a normal drop volume. A score of 1 indicates that a current printhead assembly has a very low drop volume, which is the same drop volume as the standard low drop volume printhead assembly used in the standard test module 620.

Next, the DV score may be modified based on print media factors, such as the type of print media (box 1172) (denoted by the subscript i'). For example, in a preferred embodiment a surface property (such as coarseness of fineness print media used in the printing system can be used to modify the DV score. As disclosed in co-pending application serial number 09/430,487 by Steven L. Walker entitled "Media Type Detection System for Inkjet Printing" and filed on Oct. 29, 1999, the entire contents of which are hereby incorporated by reference, a spatial frequency media detector (SFMD) can automatically identify at least three types of media. These media include photo (gossamer) paper, plain paper and transparencies.

The DV score is modified by using a test result from the SFMD. A SFMD score is determined by having the optical-electronic sensor 610 scan through the white print media. In a preferred embodiment, the sample rate is approximately 1000 sample per inch. After a fast Fourier transform (FFT) is used to measure and eliminate a high frequency portion of the scan readings, a weighted spectral power is used as the SFMD score. The SFMD score for various types of plain paper may be normalized in a range from −1 to +1. This normalized SFMD score is then subtracted from the DV score calculated in box 1164. The result of this subtracting the normalized SFMD score from the DV score is called the modified DV score, and denoted by the subscript i'. After calculation the modified DV score is stored by the installation module (box 1180).

Printing Module

The printing module 660 is used each time the printing system prints an image. The printing module 660 is applied in an imaging pipeline in the printing system before any color mapping occurs. The printing module 660 applies a one-dimensional look-up table (also referred to as a calibration table or curve) to the input RGB image and outputs a RGB image. Preferably, the same one-dimensional look-up table is applied to all of the RGB channels. In the situation where the present invention is performing hue shift calibration, different one-dimensional look-up table or multi-dimensional look-up tables can be applied separately to the RGB channels.

The calibration table is created from the modified drop volume score (denoted by subscript i') generated in the installation module 650 and from the standard calibration data stored in the memory device 640 by the standard calibration curve generation module 630. This calibration table is specific to the model of inkjet printing system being used and the particular printhead assembly installed in the printing system.

Figure 12:
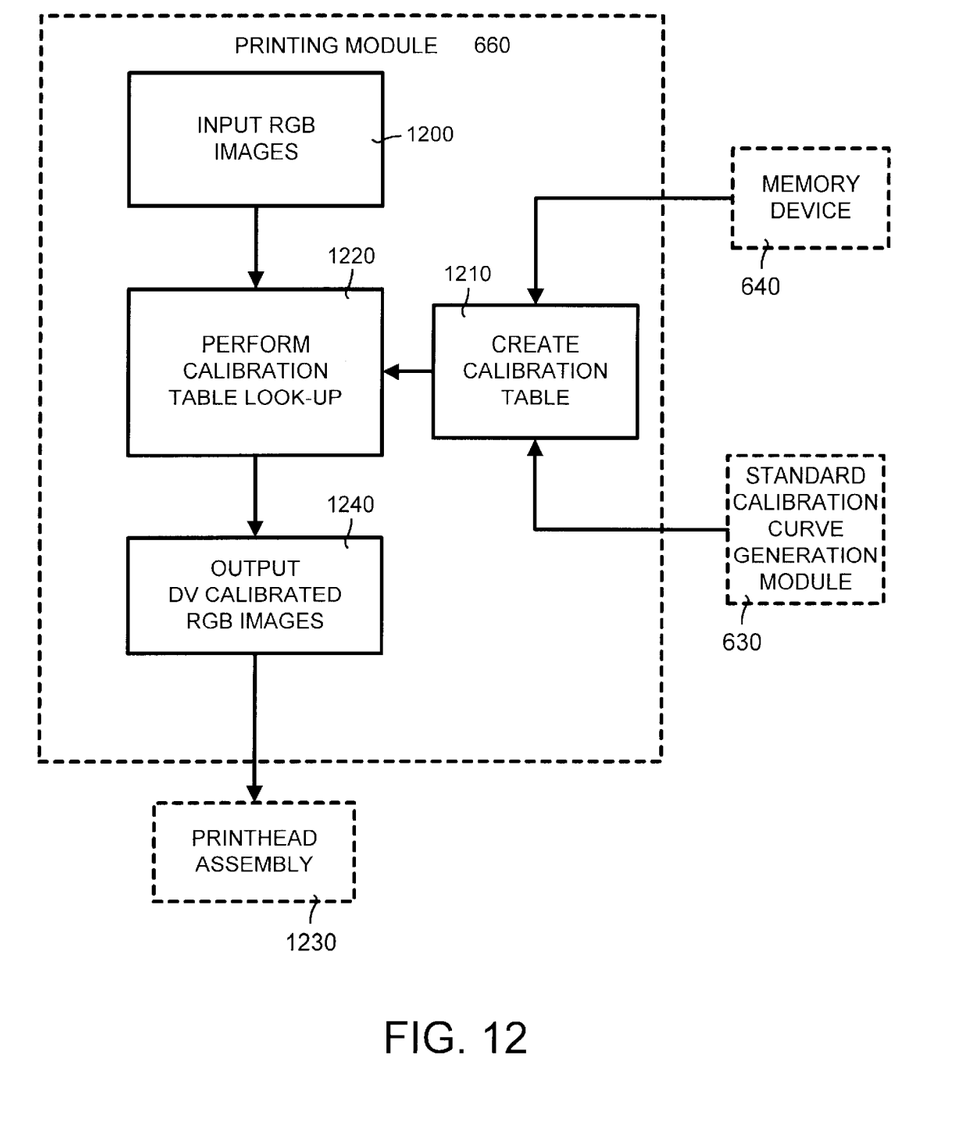
FIG. 12 is an overall flow diagram of the printing module of the print contrast calibration system.

FIG. 12 is an overall flow diagram of the printing module of the print contrast calibration system 140. The printing module 660 inputs RGB images from the host system 105 (box 1200). A calibration table is then created (box 1210) using the set of standard test curves (that are stored in the memory device 640 and were created by the standard calibration curve generation module 630) and the modified DV score (from the installation module 650).

A calibration table look-up is then performed for the RGB images that were received by the printing module (box 1220). This look-up calibration table permits a print contrast setting to be determined such that the volume of an ink drop ejected by a printhead assembly 1230 is virtually constant and any variance in print contrast is considerably reduced. The drop volume calibrated RGB images are then sent to the printhead assembly 1230 for printing on a print media (box 1240).

In the working example, the calibration table, $Y_{test}$, was created using the equation:

$$Y_{test}=(A_{i'1}*Y_{low}+A_{i'2}*Y_{norm}+A_{i'3}*Y_{high})/(A_{i'1}+A_{i'2}+A_{i'3})$$

where $A_{i'1}$, $A_{i'2}$ and $A_{i'3}$ are modified parameters based on the modified DV score and $Y_{low}$, $Y_{norm}$ and $Y_{high}$ are based on the set of standard calibration curves (there were three standard calibration curves). The calibration table, $Y_{test}$, was stored in the memory device 640.

The foregoing description of the preferred embodiments of the invention has been presented for the purposes of illustration and description. It is not intended to be exhaustive or to limit the invention to the precise form disclosed. Accordingly, the foregoing description should be regarded as illustrative rather than restrictive, and it should be appreciated that variations may be made in the embodiments described by workers skilled in the art without departing from the scope of the present invention as defined by the following claims.

What is claimed is:

1. A print contrast calibration system of an inkjet printing system, comprising:
   an optical-electronic sensor that optically senses intensity and converts intensity into a digital signal;
   a calibration module that contains calibration data pertaining to the printing system;
   an installation module that uses the optical-electronic sensor and the calibration data to determine an ink drop volume score; and
   a printing module that uses the ink drop volume score to adjust a print contrast of the printing system to alleviate any variance in print contrast.

2. The system of claim 1, wherein the calibration data includes at least two standard calibration curves each corresponding to two different printhead assemblies.

3. The system of claim 2, wherein one of the printhead assemblies has a low ink drop volume and another one of the printhead assemblies has a high ink drop volume.

4. The system of claim 2, wherein the installation module determines a printhead assembly calibration curve each time a printhead assembly is installed in the printing system.

5. The system of claim 4, wherein the printhead assembly calibration curve is determined by having the optical-electronic sensor scan a test pattern printed on a print media.

6. The system of claim 5, the drop volume score is determined each time a printhead assembly is installed in the printing system.

7. The system of claim 6, wherein the drop volume score is modified by determining the type of print media.

8. The system of claim 2, wherein the printing module creates a look-up calibration table using the calibration data and the drop volume score.

9. The system of claim 1, wherein the printing system includes a printhead assembly for ejecting ink drops onto a print media, and wherein the installation module uses the optical-electronic sensor to determine a calibration curve of a printhead assembly.

10. The system of claim 9, wherein the ink drop volume score is determined by comparing the calibration data and the printhead assembly calibration curve.

11. The printing system of claim 1, further comprising:
    a media transport device;
    a carriage assembly that supports a printhead assembly in relation to the media transport device; and
    an ink source fluidically coupled to the printhead assembly that provides ink to the printhead assembly.

12. An inkjet printing apparatus, comprising:
    a printhead assembly for ejecting ink drops onto a print media;
    an optical-electronic sensor for detecting an intensity; and
    a print contrast calibration system, comprising:
       a calibration module that determines standard calibration curves for the printing apparatus;
       an installation module uses the optical-electronic sensor to determine an ink drop volume score for the printhead assembly; and
       a printing module that determines a print contrast setting based on the ink drop volume score.

13. The printing apparatus of claim 12, wherein the standard calibration curves comprises at least two standard calibration curves each corresponding to a different printhead assembly.

14. The printing apparatus of claim 13, wherein one printhead assembly has a low ink drop volume and another printhead assembly has a high ink drop volume.

15. A method for calibrating print contrast in a printing system, comprising:
    storing at least two standard calibration curves for the printing system;
    creating a printhead assembly calibration curve for a printhead assembly installed in the printing system;
    comparing the standard calibration curves and the printhead assembly calibration curve to determine an ink drop volume score; and determining a print contrast setting based on the ink drop volume score.

16. The method of claim 15, wherein the at least two standard calibration curves each correspond to different printhead assemblies inserted into the printing system.

17. The method of claim 16, wherein one printhead assembly has a low ink drop volume and another printhead assembly has a high ink drop volume.

18. The method of claim 15, wherein creating a printhead assembly calibration curve further comprises:
    printing a test pattern on a print media;
    scanning the test pattern with an optical-electronic sensor to obtain test pattern data; and
    using the test pattern data to create a calibration curve for the printhead assembly.

19. The method of claim 15, further comprising modifying the drop volume score by determining the type of print media being used in the printing system.

20. The method of claim 19, wherein the type of print media is determined using a spatial frequency media detector.

21. The method of claim 15, wherein determining a print contrast setting further comprises:
    creating a look-up calibration table using the drop volume score and the standard calibration curves; and
    determining a print contrast setting using the look-up calibration table.

* * * * *